United States Patent
Schay et al.

(10) Patent No.: US 11,070,307 B2
(45) Date of Patent: Jul. 20, 2021

(54) CIRCULAR PATCH ARRAY FOR ANTI-JAM GPS

(71) Applicant: BAE SYSTEMS Information and Electronic Systems Integration Inc., Nashua, NH (US)

(72) Inventors: Gary A. Schay, Stony Brook, NY (US); Corrado Mancini, Bogota, NJ (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 339 days.

(21) Appl. No.: 16/285,712

(22) Filed: Feb. 26, 2019

(65) Prior Publication Data

US 2020/0274634 A1    Aug. 27, 2020

(51) Int. Cl.
| | |
|---|---|
| *G01S 19/21* | (2010.01) |
| *H04K 3/00* | (2006.01) |
| *H01Q 21/06* | (2006.01) |
| *H01Q 21/20* | (2006.01) |
| *G01S 19/36* | (2010.01) |
| *H01Q 3/26* | (2006.01) |

(52) U.S. Cl.
CPC .............. *H04K 3/224* (2013.01); *G01S 19/21* (2013.01); *G01S 19/36* (2013.01); *H01Q 3/2611* (2013.01); *H01Q 21/065* (2013.01); *H01Q 21/205* (2013.01); *H04K 3/90* (2013.01); *H04K 2203/32* (2013.01)

(58) Field of Classification Search
CPC ........ G01S 19/21; G01S 19/36; G01S 19/215; G01S 19/30; G01S 19/32; H04K 3/224; H04K 3/90; H01Q 21/065; H01Q 21/205

USPC ....................................................... 342/357.59
See application file for complete search history.

(56) References Cited

U.S. PATENT DOCUMENTS

| | | | |
|---|---|---|---|
| 5,712,641 A | 1/1998 | Casabona et al. | |
| 6,847,328 B1 | 1/2005 | Libonati et al. | |
| 7,385,555 B2 | 6/2008 | Mahmoud et al. | |
| 8,049,667 B2 | 11/2011 | Lackey | |
| 8,704,728 B2 | 4/2014 | Mujahed et al. | |
| 8,803,741 B2 | 8/2014 | Lam | |
| 2003/0052825 A1* | 3/2003 | Rao | H01Q 9/0407 343/700 MS |
| 2010/0007555 A1* | 1/2010 | Ezal | G01S 3/32 342/357.3 |
| 2018/0224557 A1* | 8/2018 | McMilin | G01S 19/215 |

FOREIGN PATENT DOCUMENTS

WO    2011/059907 A1    5/2011

OTHER PUBLICATIONS

International Search Report, PCT/US20/19675, dated Jun. 2, 2020, 10 pages.

* cited by examiner

*Primary Examiner* — Harry K Liu
(74) *Attorney, Agent, or Firm* — KPIP Law, PLLC (57) ABSTRACT

The system and method of global positioning system (GPS) anti-jam (AJ) AJ antennas utilizing a circular array of patch antennas. In some cases the circular array is conformal. The elements are single patch, dual band (L1/L2) and are linearly polarized. A mode former and progressive phase tapers are used.

18 Claims, 9 Drawing Sheets

CIRCULAR PATCH ARRAY FOR ANTI-JAM GPS

FIELD OF THE DISCLOSURE

The present disclosure relates to anti-jam (AJ) antenna technology and more particularly to global positioning system (GPS) AJ antennas utilizing a circular array of linearly polarized patch antennas.

BACKGROUND OF THE DISCLOSURE

Conventional GPS antennas are patch antennas. Patch antennas are typically flat having a ceramic body with a metallization layer on the upper and lower surfaces, and being mounted on a metal base plate. Typically, these patch antennas are square.

A stacked patch antenna for GPS has two ceramic layers bonded together providing two bands, typically L1 and L2. The partially metallized layer on the outer ceramic is tuned to resonate at L1 and is fed from the center conductor passing through both layers to a coax connector attached to the bottom exterior metallized surface of the inner ceramic body. The inner ceramic has an embedded partially metallized layer between the ceramic bodies tuned to resonate at L2. At L1 frequencies the L2 resonator acts as a reflector and at L2 frequencies the L1 resonator couples to the L2 resonator. Each resonator provides right hand circularly polarized (RHCP) radiation. Either a narrow-band single point feed (one connector) or a wide-band dual point feed requiring two RF connectors and an external quadrature coupler can be used. RHCP antennas are required to maximize reception of GPS signals.

In environments with conformal surface requirements, there are significant problems using ceramic materials. First, grinding ceramic materials to match a surface curvature is extremely expensive. Secondly, the embedded L2 resonator is closer to the ground plane and therefore has a higher Q-factor and narrower bandwidth than the L1 resonator. Therefore, a standard stacked patch antenna is undesirable. Finally, the electrically small surface (less than 3 wavelengths) on drones or projectiles alters the Q-factor and the resonant frequency of RHCP patch antenna significantly degrading gain.

Wherefore it is an object of the present disclosure to overcome the above-mentioned shortcomings and drawbacks associated with the conventional anti-jam GPS antennas, using multiple antenna elements with dual band, L1 and L2, performance that withstand electrically small surface conditions.

SUMMARY OF THE DISCLOSURE

One aspect of the present disclosure is a system comprising an anti-jamming global positioning system patch antenna array, comprising: a plurality of linearly polarized antenna elements, arranged radially about an axis, wherein each of the plurality of linearly polarized elements are tuned to be resonant in a first dimension at L1 and a second dimension L2, where L1 and L2 are orthogonal; each of the plurality of linearly polarized elements comprising a single layer and having a single feed; and a mode former being configured to combine an output from each of the plurality of linearly polarized antenna elements to form a plurality of modes, where the number of modes is equal to the number of linearly polarized antenna elements; the plurality of linearly polarized antenna elements creating, via the mode former, a right hand circularly polarized (RHCP) reference pattern and additional auxiliary omnidirectional patterns that can be used in null processing; each auxiliary mode produces a unique rate of phase change with respect to an angle of arrival that is frequency independent.

One embodiment of the anti-jamming global positioning system patch antenna is wherein L1 is about 1575 MHz and L2 is about 1228 MHz. In some cases, the antenna array is narrowband at 24 MHz and ±12 MHz about the center frequency.

Another embodiment of the anti-jamming global positioning system patch antenna array is wherein L1 is radially aligned toward a center of the radial array and L2 is circumferentially aligned in reference to the radial array. In certain embodiments, the plurality of linearly polarized elements is five linearly polarized elements.

Yet another embodiment of the anti-jamming global positioning system patch antenna array is wherein the single layer comprises metallized ceramic. In some cases, the antenna array is mounted to a conformal substrate. In certain embodiments, the anti-jamming global positioning system patch antenna array further comprises a ceramic radome.

In still yet another embodiment, the five elements have a progressive phase taper of −72° counter clockwise.

Another aspect of the present disclosure is a method of producing an anti-jamming global positioning system signal, comprising: providing a patch antenna array, comprising: a plurality of linearly polarized antenna elements, arranged radially about an axis, wherein each of the plurality of linearly polarized elements are tuned to be resonant in a first dimension at L1 and a second dimension L2, where L1 and L2 are orthogonal; each of the plurality of linearly polarized elements comprising a single layer and having a single feed; and a mode former being configured to combine an output from each of the plurality of linearly polarized antenna elements to form a plurality of modes, where the number of modes is equal to the number of linearly polarized antenna elements; creating via the plurality of linearly polarized antenna elements and the mode former, a right hand circularly polarized (RHCP) reference pattern and additional auxiliary omnidirectional patterns that can be used in null processing; each auxiliary mode producing a unique rate of phase change with respect to an angle of arrival that is frequency independent.

One embodiment of the method of producing an anti-jamming global positioning system signal is wherein L1 is about 1575 MHz and L2 is about 1228 MHz. In some cases, the antenna array is narrowband at about 24 MHz and ±12 MHz about the center frequency.

Another embodiment of the method of producing an anti-jamming global positioning system signal is wherein L1 is radially aligned toward a center of the radial array and L2 is circumferentially aligned in reference to the radial array. In some cases, the plurality of linearly polarized elements is five linearly polarized elements. In certain embodiments, the five elements have a progressive phase taper of −72° counter clockwise.

Yet another embodiment of the method of producing an anti-jamming global positioning system signal is wherein the single layer comprises metallized ceramic. In some cases, the method of producing an anti-jamming global positioning system signal further comprises providing a ceramic radome. In certain embodiments, the antenna array is mounted to a conformal substrate.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

DETAILED DESCRIPTION OF THE DISCLOSURE

In GPS systems, for ranging codes and navigation messages to travel from a satellite to a receiver, they must be modulated onto a carrier wave. According to the original GPS design, two frequencies are utilized; one at about 1575 MHz, called L1; and a second at about 1228 MHz, called L2. Military programs typically specify a minimum bandwidth of 24 MHz for M-Code GPS band waveform. A course/acquisition (C/A) code is transmitted on the L1 frequency as about a 1 MHz signal using a bi-phase shift keying (BPSK) modulation technique. An encrypted pseudorandom noise number (P(Y)-code) is transmitted on both the L1 and L2 frequencies as about a 10 MHz signal using the same BPSK modulation. However, the P(Y)-code carrier is in quadrature with the C/A carrier (meaning it is 90° out of phase).

Besides redundancy and increased resistance to jamming, a critical benefit of having two frequencies transmitted from one satellite is the ability to measure directly, and therefore remove, the ionospheric delay error for that satellite. Without such a measurement, a GPS receiver would need to use a generic model or receive ionospheric corrections from another source. A receiver capable of performing this direct measurement can be significantly more accurate and is typically referred to as a dual frequency receiver.

In one embodiment of the present disclosure, rather than using typical RHCP patch antennas, linearly polarized patch antennas are arranged in a circular pattern to provide RHCP GPS reception for L1 and L2 operation bands. RHCP is achieved by combining the GPS linearly polarized reception signals from each linearly polarized patch antenna with a progressive phase taper of −72° CCW. The resulting array reception beam is omnidirectional in azimuth and obtains maximum RHCP gain at zenith for both L1 and L2 frequency bands. This is similar to a FRPA (fixed radiation pattern antenna) GPS antenna. An advantage of using the linearly polarized patch antennas is all the tuning surfaces for the antenna are external. Having only one tuning surface which is exposed allows the use of a formable dielectric substrate such as ROGERS 3010 which can be formed to match the contour of a mounting surface and therefore lower the cost of the system significantly.

In contrast, the conventional approach for controlled radiation pattern antenna (CRPA) systems uses multiple independent circularly polarized antennas consisting of a typically central "Reference Antenna" surrounded by "N−1" auxiliary antennas. The reference antenna provides the GPS RHCP reception for L1 and L2 in an unjammed environment. Each feeds a separate channel antenna electronics unit, which processes an anti-jam solution. The anti-jam performance of the system is determined by the spatial separation of the auxiliary elements from the reference antenna. The further they are separated the greater the "time-of-arrival" or phase difference of the jamming signal at the antennas. If the antenna system is less than approximately ½ wavelength then coupling between elements may impact anti-jam performance.

The alternate approach for an anti-jam system of the present disclosure is to combine multiple antenna elements into N number of simultaneous arrays where each array is created using a different progressive phase taper where N represents the number of elements in the array. The advantage to this method is that the progressive phase taper applied creates uncoupled orthogonal patterns or modes. If coupling effects anti-jam performance then this method can provide a significant advantage. Another advantage is that the plurality of elements all have a common phase center resulting in lower group delay (GPS uses this to determine the position of the antenna). Most importantly, the mode patterns obtain phase variation with respect to the reference mode by angle-of arrival as shown in Table 1 and therefore the size of the array does not impact anti-jam performance. Therefore, the antenna can be made as small as possible without effecting anti-jam capability. The size is only limited by the efficiency of the reference and auxiliary mode impedance matching requiring arrays to be larger than ¼ wavelength for N less than or equal to 8. Note that the efficiency of the auxiliary modes need not be as efficient as the reference mode since jamming signals tend to be significantly greater than the GPS signal.

TABLE 1

Phase Variation versus Azimuth Angle:

| Mode Phase Taper | Mode Phase Change per 1° of Azimuth Angle Rotation (L2 or L1) |
|---|---|
| 0° | 0° |
| −72° | −1° |
| +72° | +1° |
| −144° | −2° |
| +144° | +2° |

In one embodiment of the present disclosure, a unique modal solution combines five linearly polarized elements. This approach yields an efficient right hand circularly polarized (RHCP) reference pattern and four additional auxiliary omnidirectional patterns that can be used in null processing. The progressive phase tapers for creating the five modes are ±144°, ±72° and 0°. This progressive phase taper is difficult to produce using RF components and creates significant RF loss. An alternative method to create the mode phase tapers for this array is to combine the elements from the digital outputs of a five channel receiver. The phase tapers for each mode can then be mathematically applied and summed for each mode. In one example, the RHCP GPS reception is achieved from the −72° progressive phase taper. The four anti-jam auxiliary signals are achieved from the other four modes. Standard anti-jam processing techniques can then be applied.

In one embodiment of the system of the present disclosure, the linear dual band (L1/L2) single feed patch is used to achieve RHCP via a mode former and results in a significantly simpler element that is inherently less sensitive to material tolerances. In certain embodiments, the element has only one ceramic layer.

Figure 1A:
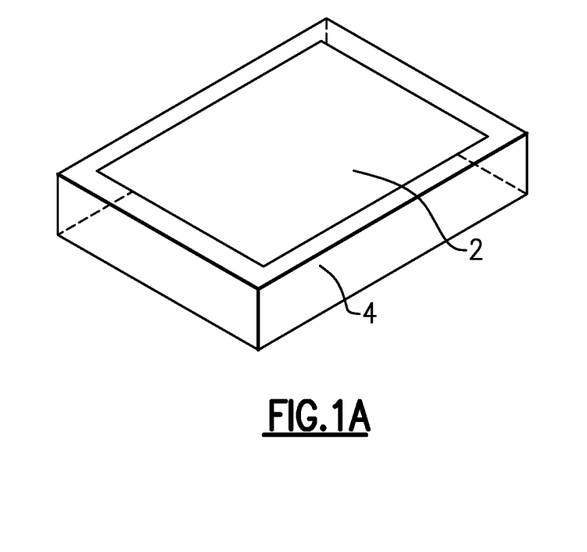
FIG. 1A is a perspective view of one embodiment of a single feed dual band patch antenna of the present disclosure.
Figure 1B:
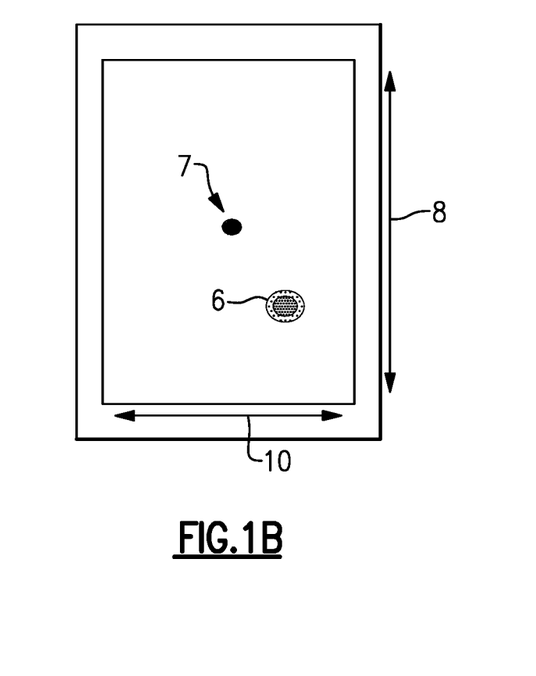
FIG. 1B is a top view of one embodiment of a single feed dual band patch antenna of the present disclosure.

Referring to FIG. 1A, a perspective view of one embodiment of a single feed dual band patch antenna of the present disclosure is shown. Referring to FIG. 1B, a top view of one embodiment of the single feed dual band patch antenna of the present disclosure is shown. FIG. 1A shows a single dual band element 2 on a substrate 4. In certain embodiments, the element is made of ceramic, where metallization on the surface of the patch antenna 2 does not extend to the metallized walls and underside of the patch antenna 4. A shorting pin (7 FIG. 1B) can be inserted from the center of the metallized surface 2 to the rear metallized surface 4 to provide a direct current (DC) grounding path to the installation structure (See, e.g., FIG. 5, element 16) to provide a static discharge path thus protecting the GPS receiver electronics.

FIG. 1B shows a single feed 6 dual band (L1/L2) patch having orthogonal linear polarizations for L1 10 and L2 8 in a single layer. In one embodiment, the patch height was about 0.37" (~0.05 λ at 1575 MHz in air). In certain embodiments, increased height and lower substrate dielectric constants increase the patch antenna bandwidth, and resulted in reduced tolerance sensitivity and improved GPS performance. The patch antenna feed point 6 connects to a RF coax connector that resides on the opposite metallized surface of the antenna. The feed point is offset from the center of the radiator metallized surface so that L1 and L2 reception performance is achieved at the required impedance of the RF connector which is assumed to be about 50 ohms. The dimension of the patch antenna metallization 10 is altered to obtain L1 reception to the linear component of the GPS signal parallel to this axis. The dimension of the patch antenna metallization 8 is altered to obtain L2 reception to the linear component of the GPS signal parallel to this axis.

Figure 1C:
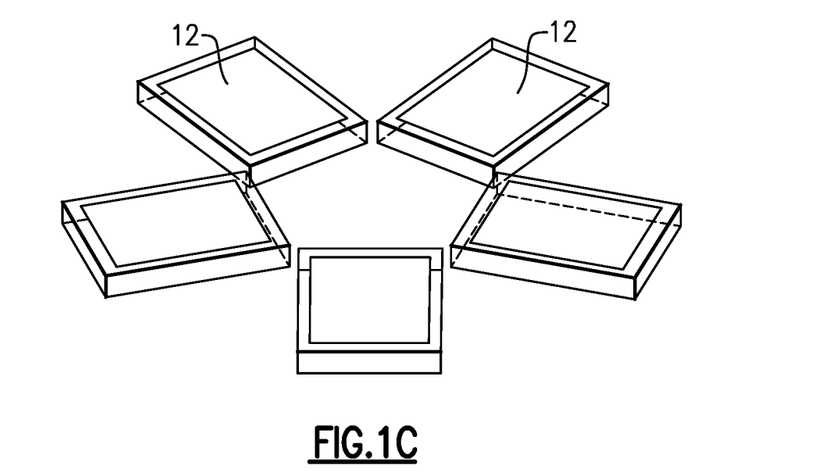
FIG. 1C is a perspective view of one embodiment of a single feed dual band patch antenna array according to the principles of the present disclosure.

Referring to FIG. 1C, a perspective view of one embodiment of a single feed dual band patch antenna circular array according to the principles of the present disclosure is shown. More specifically, multiple single feed dual band elements 12 are arranged to form a circular array. In some embodiments, five elements are used and are arranged radially about an axis. This linear dual band (L1/L2) array is a simpler element since there is only one exposed tuning surface. In certain embodiments, the individual patch antennas are arranged in a regular pentagon 12.

Using linear elements, as in the present disclosure, is a unique approach. The simple element design uses the larger array aperture for gain as well as to create the RHCP via a mode former. Among the benefits of using modes are 1) a reduction in the mutual coupling of closely spaced elements and 2) an increase in the effective aperture. Both of these features improve GPS anti-jamming (AJ) performance at the system level.

Figure 1D:
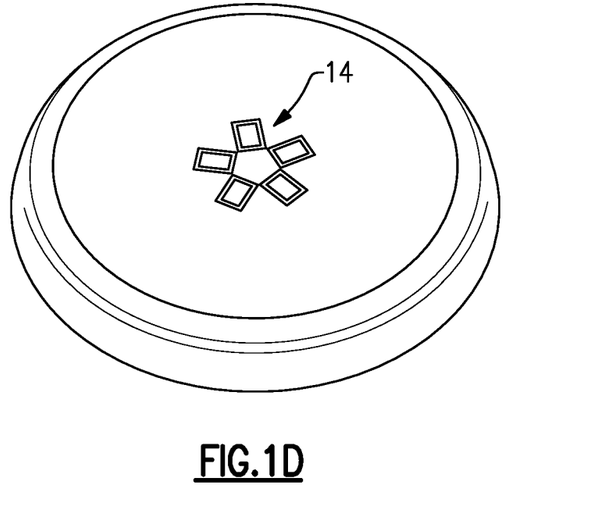
FIG. 1D is a perspective view of one embodiment of a single feed dual band patch antenna array on an electrically small ground plane according to the principles of the present disclosure.

Referring to FIG. 1D, a perspective view of one embodiment of a single feed dual band patch antenna array on an electrically small (e.g., 24-inch diameter) ground plane according to the principles of the present disclosure is shown. More specifically, the metallized surface of the patch elements is shown in black. The white area is the non-metallized surface of the patch antenna dielectric. The grey area is the conductive surface of the 24-inch diameter ground plane. In one embodiment, the edges of the ground plane are rolled with a 2-inch radius. The x-axis corresponds to 0° azimuth and 0° elevation. The y-axis is 90° azimuth and 0° elevation. The z-axis is 90° elevation. Additionally, all patterns show realized gain meaning VSWR mismatch loss in included.

Figure 2:
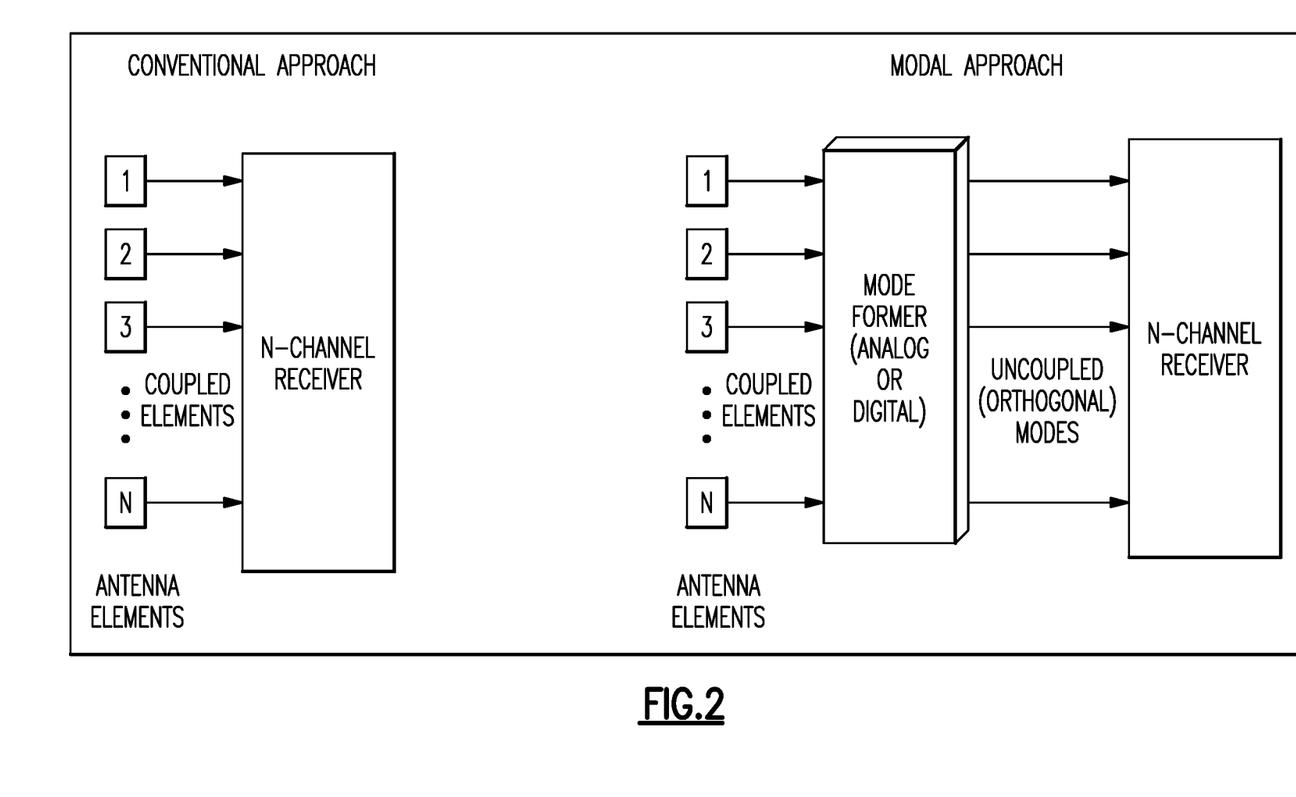
FIG. 2 shows a conventional approach as compared to a modal approach to GPS anti-jamming performance according to the principles of the present disclosure.

Referring to FIG. 2, a conventional approach compared to a modal approach to GPS anti-jamming performance according to the principles of the present disclosure is shown. More specifically, the conventional method uses N independent elements to produce up to N−1 nulls. The modal approach uses N elements and an N×N beam former that produces N orthogonal beams. In certain embodiments, orthogonal beams are uncoupled. The modal approach of the present disclosure is beneficial because it: 1) simplifies the AJ solution; 2) overcomes installation volume restrictions as linear elements are smaller and lower cost; and 3) may overcome antenna coupling problems and potentially increase AJ nulling speed.

In certain embodiments, each auxiliary modal beam has differential amplitude or phase characteristics as compared to the reference beam mode such that the jamming signal coming into the reference mode array is distinguishable as to that from the other auxiliary antennas (e.g., 4) therefore allowing the jammer to be removed (via cancellation) from the reference mode providing unjammed (reduced) to the GPS receiver. The conventional approach sums N elements for anti-jam processing in the N-channel receiver. The nulling algorithm applies varying weights (amplitude and phase adjustments) such that the output of the receiver has minimized the jamming signal to be at the thermal noise floor of the receiver leaving only (or mostly) the desired GPS signal.

A modal approach arrays the N elements into N simultaneous arrays where a similar algorithm as the conventional approach can be used. The difference between the approaches is the conventional approach has inter-element coupling which may slow down the anti-jam nulling rate, whereas the output of the mode former creates orthogonal modes (uncoupling orthogonal array beams). This uncoupling may help maintain anti-jam nulling capability for a system exhibiting a rapidly changing environment (for example, a high rate of dynamic change by the vehicle). An added benefit for when linearly polarized patch antennas are used is wide bandwidth phase stability as compared to an RHCP patch antenna on smaller contoured vehicles.

In certain embodiments, each auxiliary mode produces a unique rate of phase change with respect to angle of arrival that is frequency independent as compared to standard anti-jam systems that use displacement position with respect to the reference antenna to obtain phase change versus angle of arrival which is frequency dependent. The modal approach maintains the same rate of phase variation regardless of how small the antenna is or the particular frequency band of operation. The standard approach requires larger separation to increase the phase variation.

In one embodiment, five linear patch antennas are arranged radially and on a curved surface of a platform. The five elements combine with an analog (or optionally, a digital) network to form five orthogonal modes. Each mode provides an independent radiation pattern formed by the five elements arrayed together, similar in concept to an array fed by a Butler matrix. A Butler matrix is a type of beam-forming network. Depending on which of N inputs is accessed, the antenna beam is steered in a specific direction in one plane; Butler matrices can be combined in two "layers" to facilitate 3D scanning. A Butler matrix performs a similar function to a Rotman lens, or a phased array antenna system.

In some cases, the mode patterns, rather than the element patterns, are then combined by an antenna electronics unit to rapidly develop an AJ solution. The modal approach employs all of the elements per modal pattern resulting in potential improved GPS AJ performance at the system level. For one embodiment of AJ, different tapers are applied to different modes and these are used in a jamming suppression algorithm.

Figure 3A:
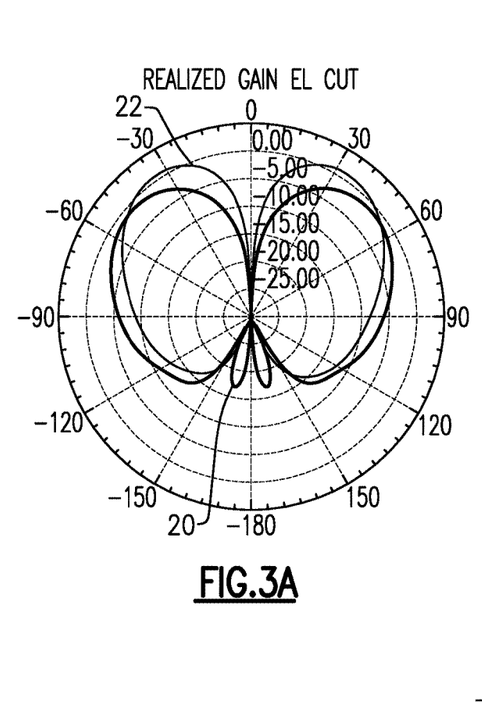
FIG. 3A, FIG. 3B and FIG. 3C shows one embodiment of the system of the present disclosure where all patch elements have 0° progressive phase taper.
Figure 3B:
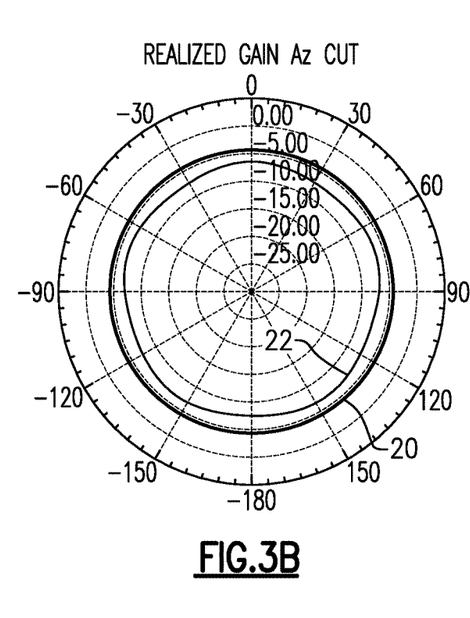
Figure 3C:
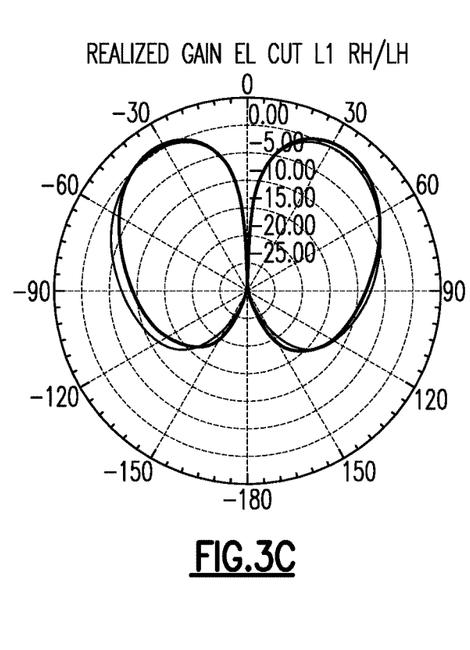

Referring to FIG. 3A, FIG. 3B and FIG. 3C, one embodiment of the system of the present disclosure where all elements have 0° progressive phase taper. More specifically, FIG. 3A shows an elevation plane pattern of 0° progressive phase taper. The resulting patterns at L2 20 and L1 22 center frequencies are equivalent to a monopole located at the center of the array. FIG. 3B shows an azimuth plane pattern at 10° elevation for the 0° progressive phase mode showing the azimuth coverage is omnidirectional. In this example, L2 was 1227.60 MHz and L1 was 1575.42 MHz. FIG. 3C shows the elevation plane pattern at 0° azimuth showing the response to RHCP and LHCP gain at L1. This shows the radiated pattern is linearly polarized since both RHCP and LHCP are approximately equal.

Figure 4A:
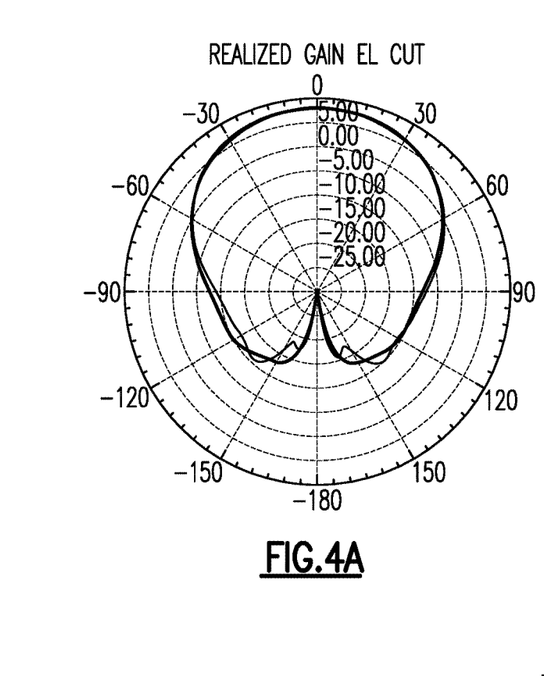
FIG. 4A, FIG. 4B, and FIG. 4C shows one embodiment of the system of the present disclosure where all patch elements have −72° progressive phase taper.
Figure 4B:
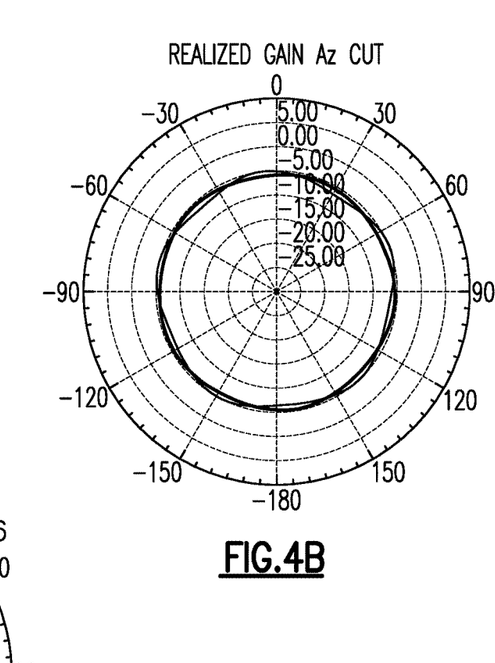
Figure 4C:
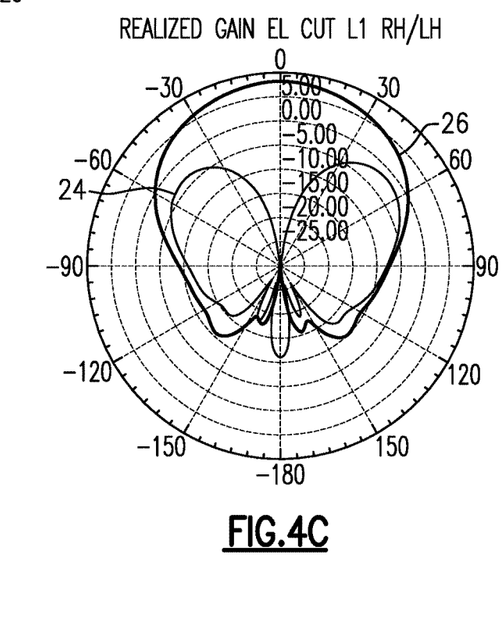

Referring to FIG. 4A, FIG. 4B and FIG. 4C, one embodiment of the system of the present disclosure where all elements have −72° progressive phase taper. More specifically, this mode provides the RHCP reception for GPS signals in an unjammed environment. FIG. 4A shows elevation plane pattern of −72° progressive phase taper. The resulting patterns at L2 20 and L1 22 center frequencies are equivalent to a dual-band RHCP patch antenna providing maximum RHCP gain at the zenith. FIG. 4B shows an azimuth plane pattern at 10° elevation for the −72° progressive phase taper showing the azimuth coverage is omnidirectional at L1 and L2. In this example, L2 was 1227.60 MHz and L1 was 1575.42 MHz. FIG. 4C shows an elevation plane pattern at 0° azimuth showing the response to RHCP and LHCL gain at L1. This shows the radiated pattern achieves 0 dB AR (axial ratio) at the zenith evident by noting the LHCP is less than −30 dBic. Also note that the difference between RHCP and LHCP diminishes at lower elevations. The horizontally polarized component of the patch antenna is reduced since it cannot propagate along the metallic ground plane leaving only the vertical component. LHCP gain 24 is represented by the internal trace, the RHCP gain 26 is represented by the external trace at 1575.42 GHz.

Figure 4D:
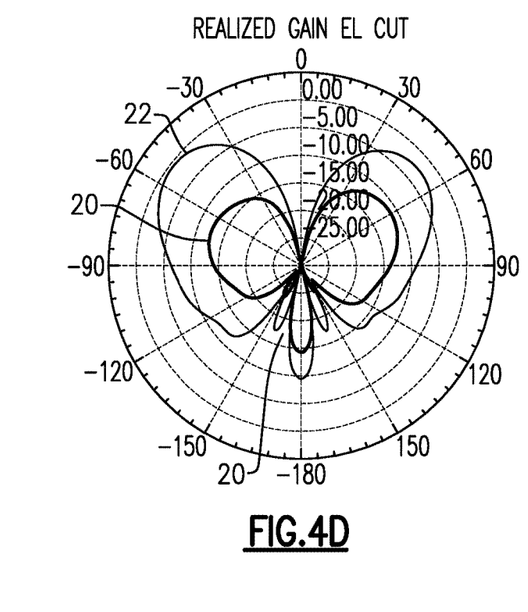
FIG. 4D, FIG. 4E, and FIG. 4F shows one embodiment of the system of the present disclosure where all patch elements have +72° progressive phase taper.
Figure 4E:
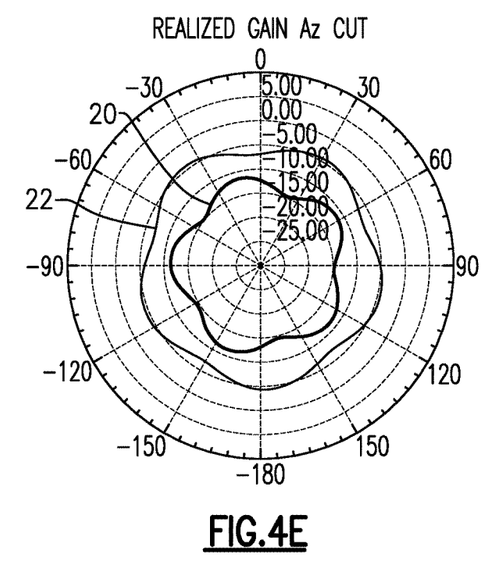
Figure 4F:
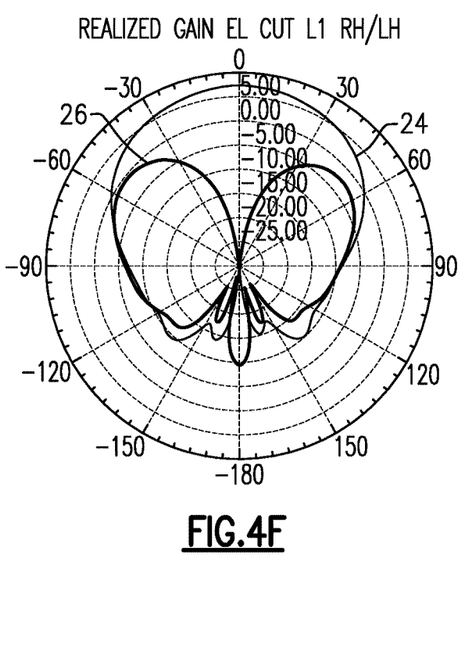

Referring to FIG. 4D, FIG. 4E and FIG. 4F, one embodiment of the system of the present disclosure where all elements have 72° progressive taper. More specifically, FIG. 4D shows an elevation plane pattern for +72° progressive phase taper. The resulting patterns at L2 20 and L1 22 center frequencies are equivalent to an LHCP patch antenna located at the center of the array. Note that though it is LHCP, the gain response at low elevations is good. In this example, L2 was 1227.60 MHz and L1 was 1575.42 MHz. In FIG. 4D and in FIG. 4E L2 is represented by the internal trace. FIG. 4E shows an azimuth plane pattern at 10° elevation for the +72° progressive phase taper showing the azimuth coverage is omnidirectional. FIG. 4F shows an elevation plane pattern at +72° azimuth showing the response to RHCP and LHCP gain at L1. This shows the radiated pattern is equivalent to an LHCP patch antenna and is linearly polarized at low elevations since both RHCP 26 and LHCP 24 are approximately equal. In FIG. 4F RHCP is represented by the internal trace.

Figure 5A:
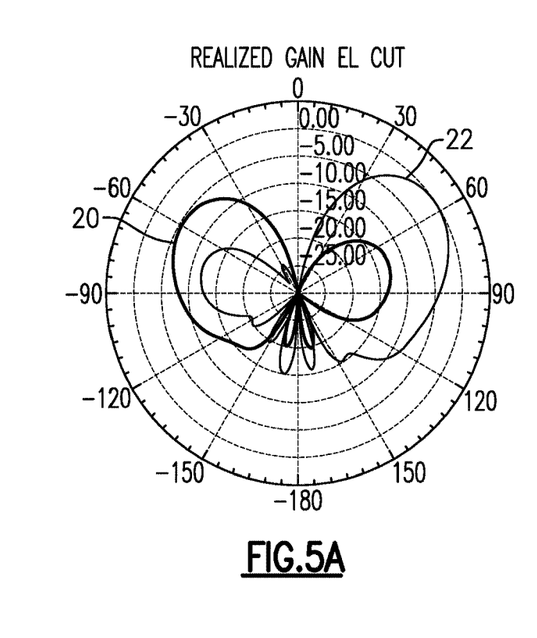
FIG. 5A, FIG. 5B, and FIG. 5C shows one embodiment of the system of the present disclosure where all patch elements have +144° progressive phase taper.
Figure 5B:
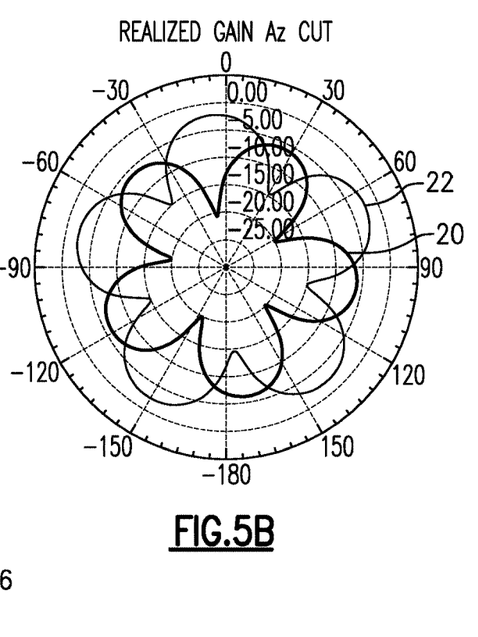
Figure 5C:
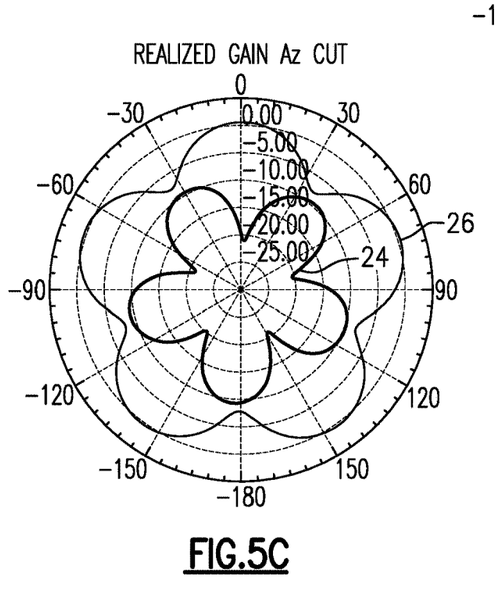

Referring to FIG. 5A, FIG. 5B and FIG. 5C, one embodiment of the system of the present disclosure where all elements have +144° progressive phase taper. More specifically, FIG. 5A shows an elevation plane pattern for +144° progressive phase taper. The single elevation plane pattern at 0° azimuth does not represent the maximum elevation gain achieved. FIG. 5B shows an azimuth plane pattern at 10° elevation for the +144° progressive phase mode showing the azimuth coverage. The azimuthal response to RHCP amplitude variation is increased since this mode alters from vertical polarization to LHCP between the azimuth plane pattern lobes. In this example, L2 was 1227.60 MHz and L1 was 1575.42 MHz. FIG. 5C demonstrates this showing the response to vertically 26 and horizontally 24 polarized gain at L1. The lobes that are vertically polarized occur where the horizontal polarization gain is significantly less than the vertical polarization gain. The lobes that are LHCP occur where the horizontally polarized lobes come within approximately 2 dB of the vertically polarized pattern.

Figure 5D:
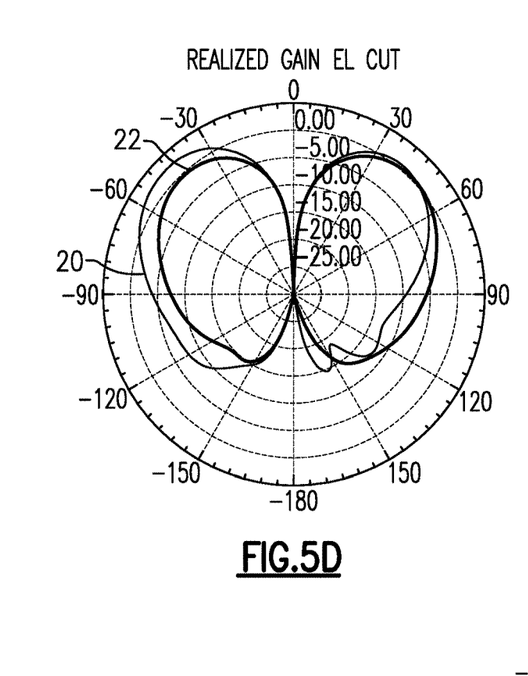
FIG. 5D, FIG. 5E, and FIG. 5F shows one embodiment of the system of the present disclosure where all patch elements have −144° progressive phase taper.
Figure 5E:
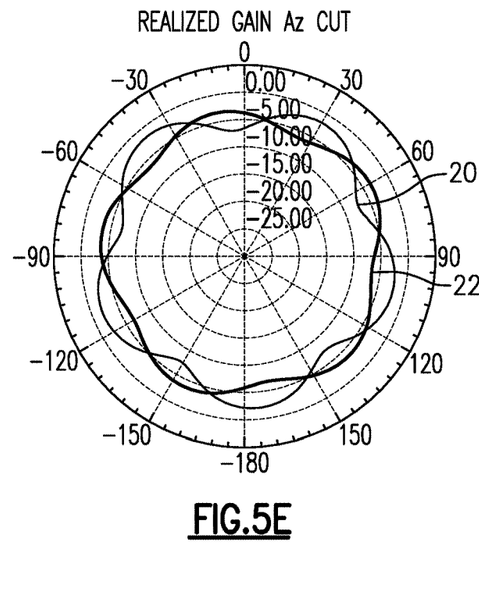
Figure 5F:
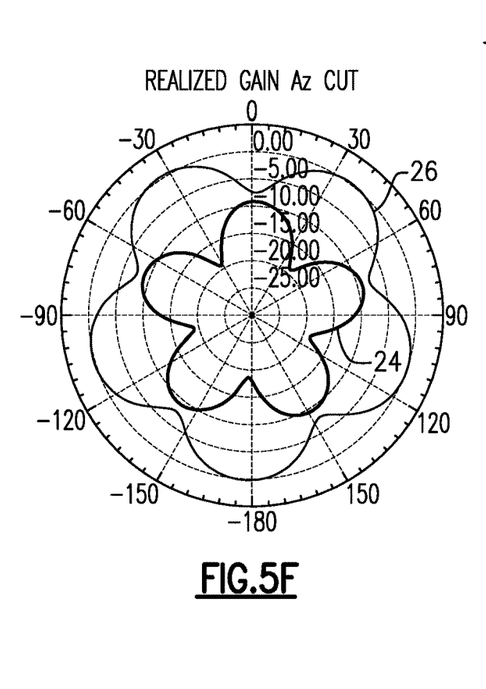

Referring to FIG. 5D, FIG. 5F and FIG. 5F, one embodiment of the system of the present disclosure where all elements have −144° progressive phase taper are shown. More specifically, FIG. 5D shows an elevation plane pattern for −144° progressive phase taper. The single elevation plane pattern at 0° azimuth does not represent the maximum elevation gain achieved. FIG. 5E shows an azimuth plane pattern at 10° elevation for the −144° progressive phase mode showing the azimuth coverage. The azimuthal response to RHCP amplitude variation is increased since this mode alters from vertical polarization to RHCP between the azimuth plane pattern lobes. In this example, L2 was 1227.60 MHz and L1 was 1575.42 MHz. FIG. 5F shows the vertically 28 and horizontally 30 polarized response.

In one embodiment of the circular patch array of the present disclosure, the linearly polarized patch antenna has a bandwidth of 24 MHz, ±12 MHz about the center frequency. In some embodiments, L1 is radially aligned toward the center and L2 is circumferentially aligned. The arrangement of whether the longer or shorter axis of the patch antenna is aligned radially is arbitrary. Once selected, all of the elements must align the same way. There is some benefit in low elevation gain improvement for which arrangement is radial (L1 or L2). In some cases, the choice may be restricted by room on the mounting structure.

In some cases, the use of orthogonal, circular array modes, which can be formed digitally or through analog circuits is preferred. This modal approach has several benefits and also allows the use of linear elements. In certain embodiments of the present disclosure, the mode former is placed behind a thermal insulation boundary for extreme environment conditions. In some cases, the digital electronics for the mode former can be integrated within the antenna assembly.

In one embodiment, a plurality of linear, single feed patch antennas and modal beamforming is used to excite efficient RHCP modes in a circular, anti-jam GPS antenna array. The linear single feed patches only have one metallized surface and do not require embedded resonators. In one embodiment, modeling software was used to take a flat array and shape it to a conformal surface. See, e.g., FIG. 6. This solution uses five linear patch antennas 12 which are tuned to be resonant in one dimension at L1 and at another dimension L2. The output of each antenna is combined to form five modes. It is understood that this approach is not limited to five elements and can be done with N number of elements which form N number of modes. In some cases, the patch antennas form a regular pentagon that is bonded into an installation plate 16 which is then mounted into the vehicle.

Figure 6:
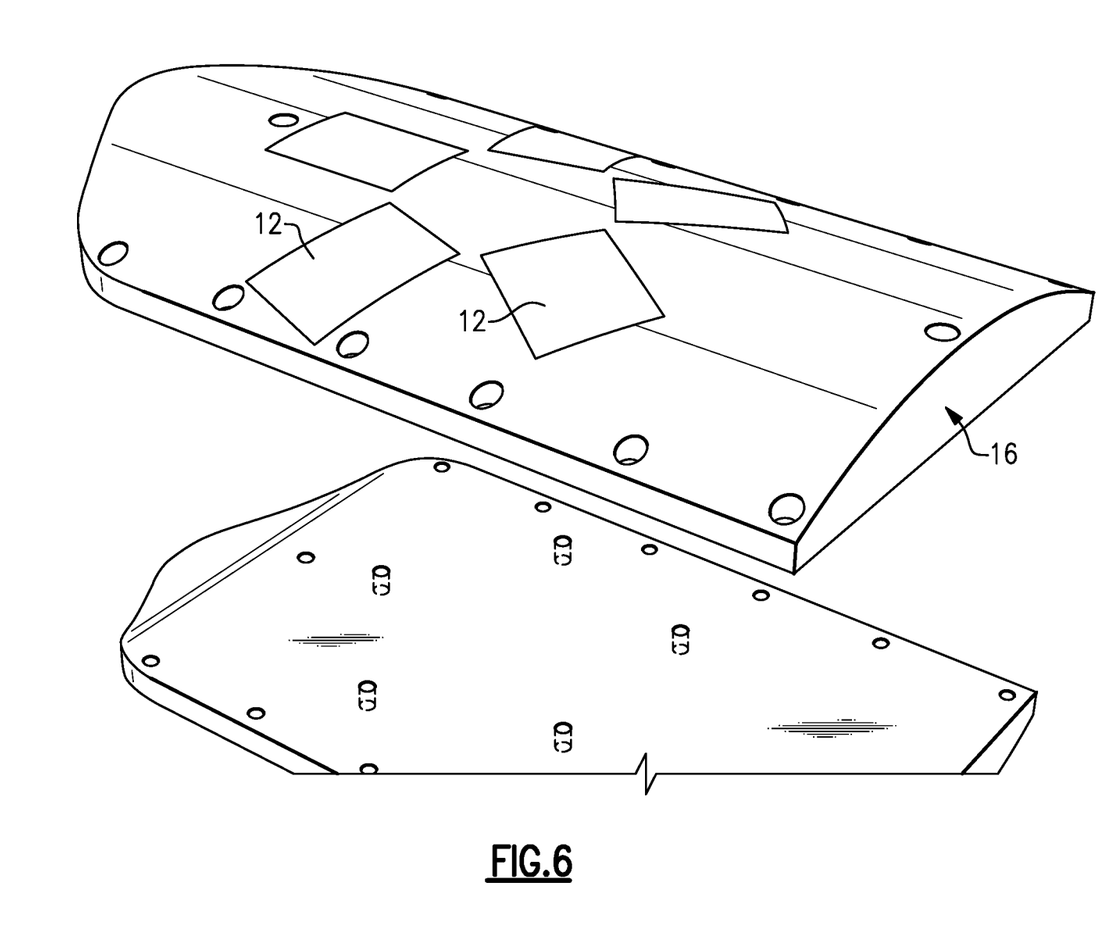
FIG. 6 is a diagram of one embodiment of the system of the present disclosure integrated onto a curved surface.

Referring to FIG. 6, a perspective view of one embodiment of a single feed dual band patch antenna circular array 12 on a curved surface according to the principles of the present disclosure is shown. In one embodiment, the RF is applied in such a way that there is a −72° phase taper. For example, in a counter clockwise direction around the five element array the 1st is a 0°, the second is at −72°, the 3rd is at −144°, the 4th is at −216°, and the 5th is at −288°, such that it represents a complete 360°. In one embodiment a mode former is used to provide for the amplitude for each element, where each element receives ⅕th of the power at the particular phase offset. The summation of the five elements with this specific progressive phase taper and uniform amplitude to all elements produces an RHCP reception beam with azimuth and elevation coverage very similar to a single FRPA (Fixed Radiation Pattern Antenna) installed on a similar vehicle. In one embodiment, the circular array of patch antennas is embedded such that each patch antenna's outer surface follows the contour of the vehicle structure 14. The shape of contour does not represent an actual vehicle but was used to simulate a structure for EM modeling purposes.

Still referring to FIG. 6, in some cases material can be removed from the underside of the antenna panel 16 to reduce the antenna weight. The antenna design of the present disclosure ensures operation in the climatic conditions of a flight envelope for the platform.

One embodiment of the antenna assembly comprises a monolithic carbon-carbon composite panel assembly with five small rectangular antenna element cavities. The individual antenna elements are identical. Each element comprises one simple ceramic patch element. The ceramic material was selected to closely match the thermal coefficient of expansion of the carbon-carbon antenna panel. This approach eliminates thermal stress over the operational temperature range of the system.

In certain embodiments, homogenous layup of the various materials ensures the antenna meets its electrical and mechanical performance requirements. In one embodiment, the element assembly is a serial stack-up composed of an ultra-high-temperature ceramic dielectric SMA connector, or the like, a ceramic single-layer element with high-temperature metallization on the upper surface, and a ceramic radome. In one embodiment, all materials for the antenna array provide high-temperature performance and have coefficients of thermal expansion closely matched with the platform's (e.g. an air vehicle). In one embodiment, the platform comprises a carbon-carbon structure.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:
1. An anti-jamming global positioning system patch antenna array, comprising:
a plurality of linearly polarized antenna elements, arranged radially about an axis, wherein each of the plurality of linearly polarized elements are tuned to be resonant in a first dimension at L1 and a second dimension L2, where L1 and L2 are orthogonal;

each of the plurality of linearly polarized elements comprising a single layer and having a single feed; and a mode former being configured to combine an output from each of the plurality of linearly polarized antenna elements to form a plurality of modes, where the number of modes is equal to the number of linearly polarized antenna elements;

the plurality of linearly polarized antenna elements creating, via the mode former, a right hand circularly polarized (RHCP) reference pattern and additional auxiliary omnidirectional patterns that can be used in null processing;

each auxiliary mode produces a unique rate of phase change with respect to an angle of arrival that is frequency independent.

2. The anti-jamming global positioning system patch antenna array according to claim 1, wherein L1 is about 1575 MHz and L2 is about 1228 MHz.

3. The anti-jamming global positioning system patch antenna array according to claim 2, wherein the antenna array is narrowband at about 24 MHz and ±12 MHz about the center frequency.

4. The anti-jamming global positioning system patch antenna array according to claim 1, wherein L1 is radially aligned toward a center of the radial array and L2 is circumferentially aligned in reference to the radial array.

5. The anti-jamming global positioning system patch antenna array according to claim 1, wherein the plurality of linearly polarized elements is five linearly polarized elements.

6. The anti-jamming global positioning system patch antenna array according to claim 1, wherein the single layer comprises metallized ceramic.

7. The anti-jamming global positioning system patch antenna array according to claim 6, wherein the antenna array is mounted to a conformal substrate.

8. The anti-jamming global positioning system patch antenna array according to claim 7, further comprising a ceramic radome.

9. The anti-jamming global positioning system patch antenna array according to claim 5, wherein the five elements have a progressive phase taper of −72° counter clockwise.

10. A method of producing an anti-jamming global positioning system signal, comprising:
providing a patch antenna array, comprising:
a plurality of linearly polarized antenna elements, arranged radially about an axis, wherein each of the plurality of linearly polarized elements are tuned to be resonant in a first dimension at L1 and a second dimension L2, where L1 and L2 are orthogonal;

each of the plurality of linearly polarized elements comprising a single layer and having a single feed; and a mode former being configured to combine an output from each of the plurality of linearly polarized antenna elements to form a plurality of modes, where the number of modes is equal to the number of linearly polarized antenna elements;

creating via the plurality of linearly polarized antenna elements and the mode former, a right hand circularly polarized (RHCP) reference pattern and additional auxiliary omnidirectional patterns that can be used in null processing;

each auxiliary mode producing a unique rate of phase change with respect to an angle of arrival that is frequency independent.

11. The method of producing an anti-jamming global positioning system signal according to claim 10, wherein L1 is about 1575 MHz and L2 is about 1228 MHz.

12. The method of producing an anti-jamming global positioning system signal according to claim 11, wherein the antenna array is narrowband at about 24 MHz and ±12 MHz about the center frequency.

13. The method of producing an anti-jamming global positioning system signal according to claim 10, wherein L1 is radially aligned toward a center of the radial array and L2 is circumferentially aligned in reference to the radial array.

14. The method of producing an anti-jamming global positioning system signal according to claim 10, wherein the plurality of linearly polarized elements is five linearly polarized elements.

15. The method of producing an anti-jamming global positioning system signal according to claim 10, wherein the single layer comprises metallized ceramic.

16. The method of producing an anti-jamming global positioning system signal according to claim 15, wherein the antenna array is mounted to a conformal substrate.

17. The method of producing an anti-jamming global positioning system signal according to claim 16, further comprising a ceramic radome.

18. The method of producing an anti-jamming global positioning system signal according to claim 14, wherein the five elements have a progressive phase taper of −72° counter clockwise.

* * * * *